US006955782B1

(12) United States Patent
Ratliff, Jr.

(10) Patent No.: US 6,955,782 B1
(45) Date of Patent: Oct. 18, 2005

(54) METHOD OF MOLDING A TIRE AND MOLD THEREFOR

(75) Inventor: Billy Joe Ratliff, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/130,335

(22) PCT Filed: Nov. 24, 1999

(86) PCT No.: PCT/US99/27906

§ 371 (c)(1),
(2), (4) Date: May 10, 2002

(87) PCT Pub. No.: WO01/38109

PCT Pub. Date: May 31, 2001

(51) Int. Cl.[7] .............................................. B29C 35/02
(52) U.S. Cl. ........................................ 264/326; 425/46
(58) Field of Search ............................ 425/46; 264/326

(56) References Cited

U.S. PATENT DOCUMENTS

| 1,956,011 | A | * | 4/1934 | Evans ...................... 152/209.3 |
| 3,247,880 | A | | 4/1966 | Batori ........................ 152/209 |
| 3,315,312 | A | * | 4/1967 | Larson ......................... 425/19 |
| 3,645,314 | A | * | 2/1972 | Verdier ................... 152/209.22 |
| 4,411,175 | A | * | 10/1983 | Takahashi et al. ......... 76/107.1 |
| 5,085,259 | A | * | 2/1992 | Goergen et al. ....... 152/209.18 |
| 5,303,758 | A | * | 4/1994 | Clementz et al. ........... 152/523 |
| 5,580,404 | A | * | 12/1996 | Hitzky ................... 152/209.22 |
| 5,645,661 | A | | 7/1997 | Clementz et al. ........... 152/523 |
| 5,733,394 | A | * | 3/1998 | Baus et al. ................. 152/208 |
| 5,769,976 | A | * | 6/1998 | Omokawa et al. ............ 425/47 |
| 5,807,446 | A | * | 9/1998 | Ratliff, Jr. .................. 152/523 |
| 6,053,228 | A | * | 4/2000 | Baker .......................... 152/523 |
| 6,253,815 | B1 | * | 7/2001 | Kemp et al. ................. 152/523 |
| 6,408,910 | B1 | * | 6/2002 | Lagnier et al. ............... 425/46 |

FOREIGN PATENT DOCUMENTS

| AU | 37769/78 | * | 1/1980 |
| EP | 0320143 | | 6/1989 |
| EP | 0726174 | | 8/1996 |
| FI | 32136 | * | 5/1962 |
| WO | WO99/52720 | | 10/1999 |

OTHER PUBLICATIONS

Patent Abstracts of Japan, vol 015, no 129 (M-1096), Mar. 25, 1991 & JP 03 009817 A (Bridgestone Corp), Jan. 17, 1991 abstract; figures 1-4.

* cited by examiner

Primary Examiner—James P. Mackey
(74) Attorney, Agent, or Firm—Nancy T. Krawczyk (57) ABSTRACT

A tire molding method as disclosed wherein a segmented mold (2) has lugs (40) in the shoulder regions of the segments (4) with complimentary lug extensions (30) in the sidewall forming annular rings (6,8). The lug extensions (30) align with and form the appearance of a lug (40) that extends radially inward well into the sidewall of the tire (20). the resultant tire (20) and the mold (2) for making the tire (20) are less costly to fabricate than prior art segmented molds.

9 Claims, 8 Drawing Sheets

METHOD OF MOLDING A TIRE AND MOLD THEREFOR

TECHNICAL FIELD

The present invention relates to the art of molding tires having a tread pattern imparted thereon.

BACKGROUND ART

In the manufacture of tires the unvulcanized tire is placed into a mold, the mold has surfaces for forming the tread and sidewalls of the tire.

There are conventionally two basic types of tire molds; the first type is a two piece mold the second type is a segmented mold.

The two-piece mold is considered the least expensive type, generally. The mold has two halves, an upper mold half and a lower mold half, generally these halves meet at the tread center or equatorial plane of the tire. The mold halves typically open similar to a clamshell. The molds typically work best for tires having minimal blading, particularly in the tread shoulders.

When superior quality tires or more complex treads having shoulder blading and intricate grooves are needed then the use of segmented molds is preferred. Segmented molds generally have radially expanding and contracting segments for forming the tread. The segments form an annular ring when the mold is closed. When the mold is opened the segments are moved radially outwardly to release the tread from the segments. As can be appreciated such a mold permits blades and circumferential and laterally inclined groves forming ribs to be used in the mold segments. The segments are radially expanded forcing the segments from the freshly molded tread pattern without cutting the tread elements. Unlike the two piece mold, the tread elements do not need to deform out of the way of these ribs and blades as the mold opens.

These features or benefits of a segmented type mold come with a somewhat higher cost of the mold.

In most tire molding applications the segmented mold also has two annular sidewall forming rings or plates. These sidewall rings of the mold can open similar to the two piece mold. The primary difference is the radially outer extremes of the two annular rings are abuttingly in contact with the tread forming segments when the mold is closed. The primary benefit to this mold is the segments can be made with a minimum concavity limited to the tread itself. In most passenger and light truck tires the tread extends radially inwardly to a very short distance called the tread shoulder. Thereafter, the tire sidewalls having indicia and other decorative bands are formed extending from the tread shoulders to the tire beads.

It has become advantageous to form the tread extending much further down the tire sidewall. The Goodyear Tire & Rubber company has developed a tire called the Wrangler MT/R which has the shoulder tread elements protruding outwardly and extending down the sidewall to a location 75% of the section height of the tire above the nominal rim diameter. This on/off road light truck tire employs extended shoulder traction elements to enhance off-road traction.

In order to make this tire, the tread forming segments of the mold were extended greatly increasing the depth of the concavity of the segments. Correspondingly, the resultant sidewall plates or rings were reduced diametrically. The resultant tire had a very distinctive appearance, but at a fairly large increase in tooling cost.

The present invention has provided a new way to fabricate segmented molds with greatly reduce construction costs while at the same time providing extended axially outer ends of shoulder tread elements.

Besides providing a lower cost way to make such a tire, the present invention teaches a novel method of increasing the visual appearance of the tread shoulder.

SUMMARY OF THE INVENTION

The method of molding a tire (20) in a segmented mold (2) having tread forming segments (4) and a pair of annular sidewall forming rings (6,8) is disclosed.

The method has the steps of placing an unvulcanized tire (20) into the segmented mold (2); closing the mold (2) radially contracting the tread forming segments (4) into an annular ring (6,8) having a plurality of shoulder tread element forming cavities (11) having circumferentially spaced axially outer ends (9) and bringing the tread forming segments (4) and annular sidewall forming rings (6,8) into abutting relation circumferentially aligning a plurality of tread element extension forming surfaces (12) of the sidewall forming annular rings (6,8) with the axially outer ends (9) of the tread element forming cavities (11) of the tread forming segments (4); applying heat and pressure thereby curing the tire (20); opening the mold (2); and removing the tire (20).

The method further includes the step of fabricating the segmented mold (2) and aligning the tread element extension forming surfaces (12) of the annular rings (6,8) with the axially outer ends (9) of the tread forming cavities (11) of the segments (4).

In the preferred method the tread (22) formed by the segments (4) is pitched with two or more pitch sizes arranged in preselected sequence and the tread elements extension surfaces (12) of each annular ring (6,8) are pitched to correspond to the pitch sizes and preselected pitch sequence of the tread forming segments (4).

Definitions

"Angle of Incidence" means the angle formed by a line from a ray of light falling on a surface and a perpendicular arising from the point of incidence.

"Axial" and "axially" means the lines or directions that are parallel to the axis of rotation of the tire.

"Circumferential" means lines or directions extending along the perimeter of the surface of the annular tread perpendicular to the axial direction.

"Light deflection" means that as light strikes a surface, the reflected light is angularly directed relative to the angle of incidence of the light source yielding what appears to be a light absorbing characteristic to an observer who is positioned in general alignment with the angle of incidence.

"Light reflection" means that as light strikes an object, the reflected light is generally aligned with the angle of incidence yielding what appears to be a shiny or reflective characteristic to an observer who is positioned in general alignment with the angle of incidence.

"Radial" and "radially" mean directions radially toward or away from the axis of rotation of the tire.

"Sidewall" means that portion of a tire between the tread and the bead.

"Tread" means that portion of the tire that comes into contact with the road under normal inflation and load.

DETAILED DESCRIPTION OF THE INVENTION

Figure 1:
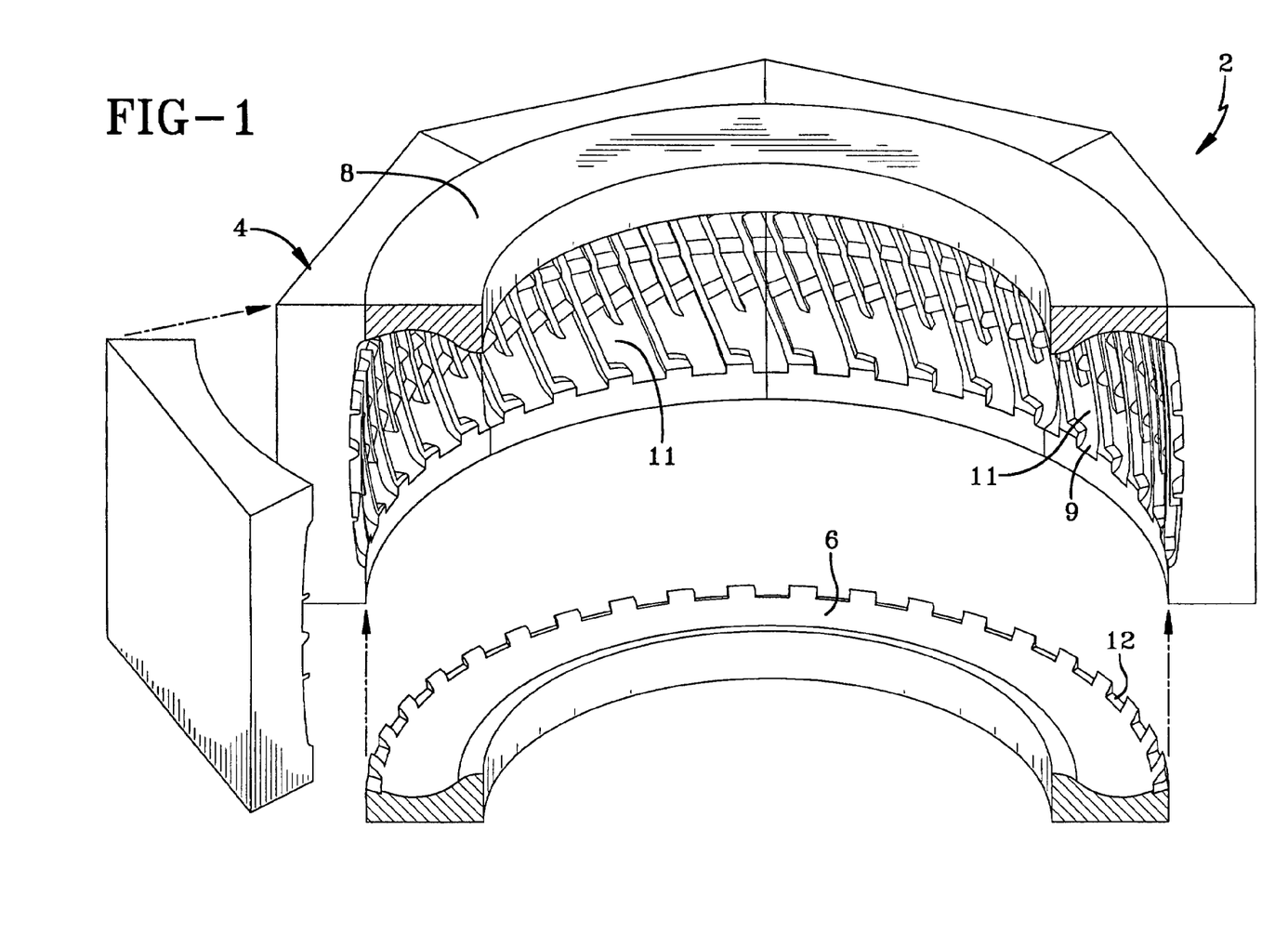
FIG. 1 is a cross-sectional view of a portion of a tire mold in a partial exploded perspective according to the invention.

With reference to FIG. 1 a cross-sectional view of a segmented mold (2) according to the invention is shown. The mold (2) when in the open position has the segments (4) expanded radially outwardly and spaced from the lower sidewall forming annular ring (6). The upper sidewall-forming ring (8) is tilted away from the segments (4). In this open position the cured tire (20) can be removed from the mold (2).

To cure a green or uncured tire the segments (4) preferably are moved radially inward abutting the lower sidewall ring (6) then the green tire (20) is placed in the mold (2) with an inflatable curing bladder (not illustrated) inserted in the air chamber of the tire (20).

Figure 2:
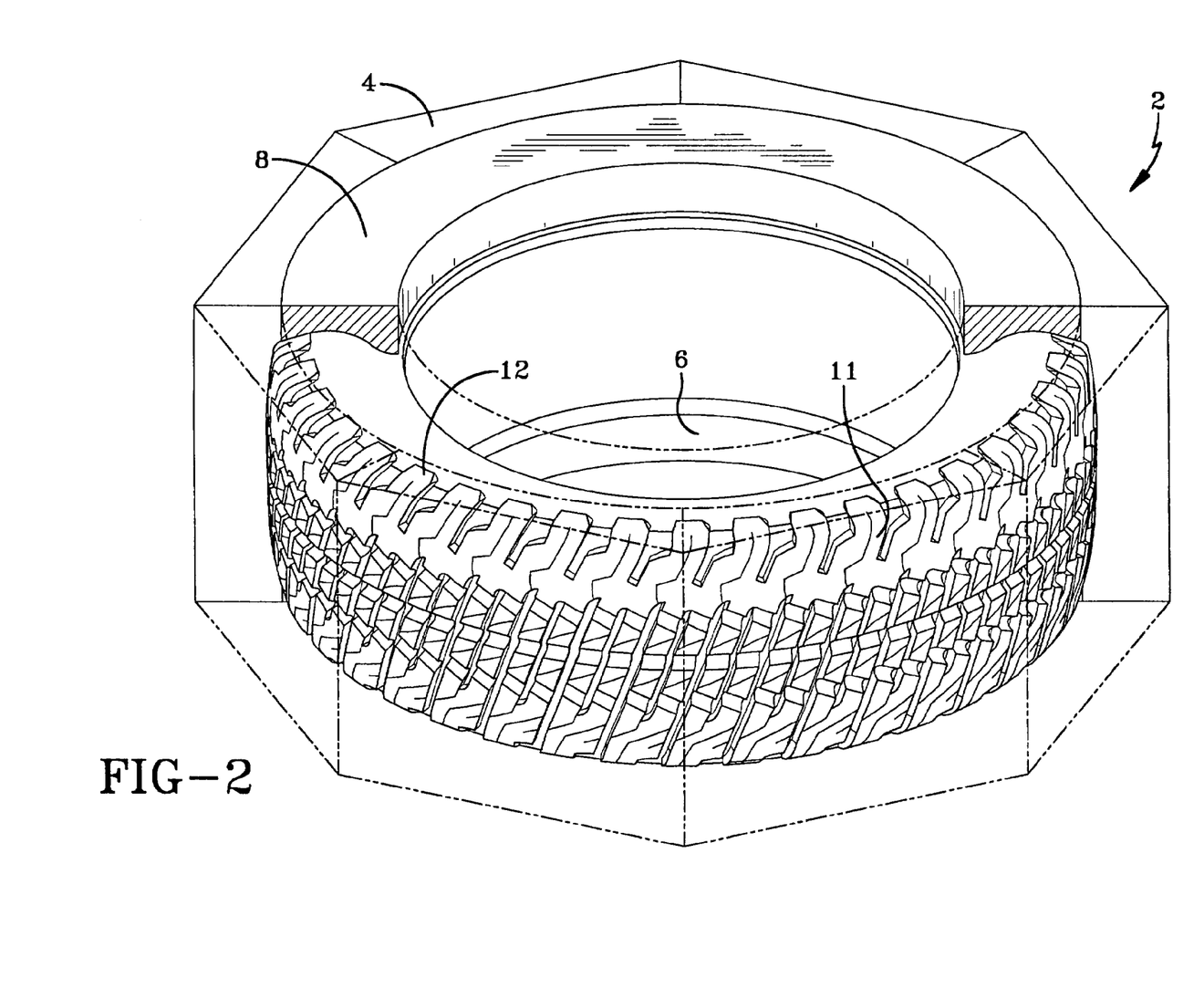
FIG. 2 is the portion of a tire mold of FIG. 1 in the closed position.

The top sidewall forming the upper ring (8) is closed into abutting relation with the segments (4) as shown in FIG. 2.

The tire (20) is then cured by applying heat and pressure to the inside of the mold (2). The curing bladder (not illustrated) is inflated and expands pressing the tire (20) firmly against the tread forming segments (4) and the sidewall forming rings (6,8).

Figure 3:
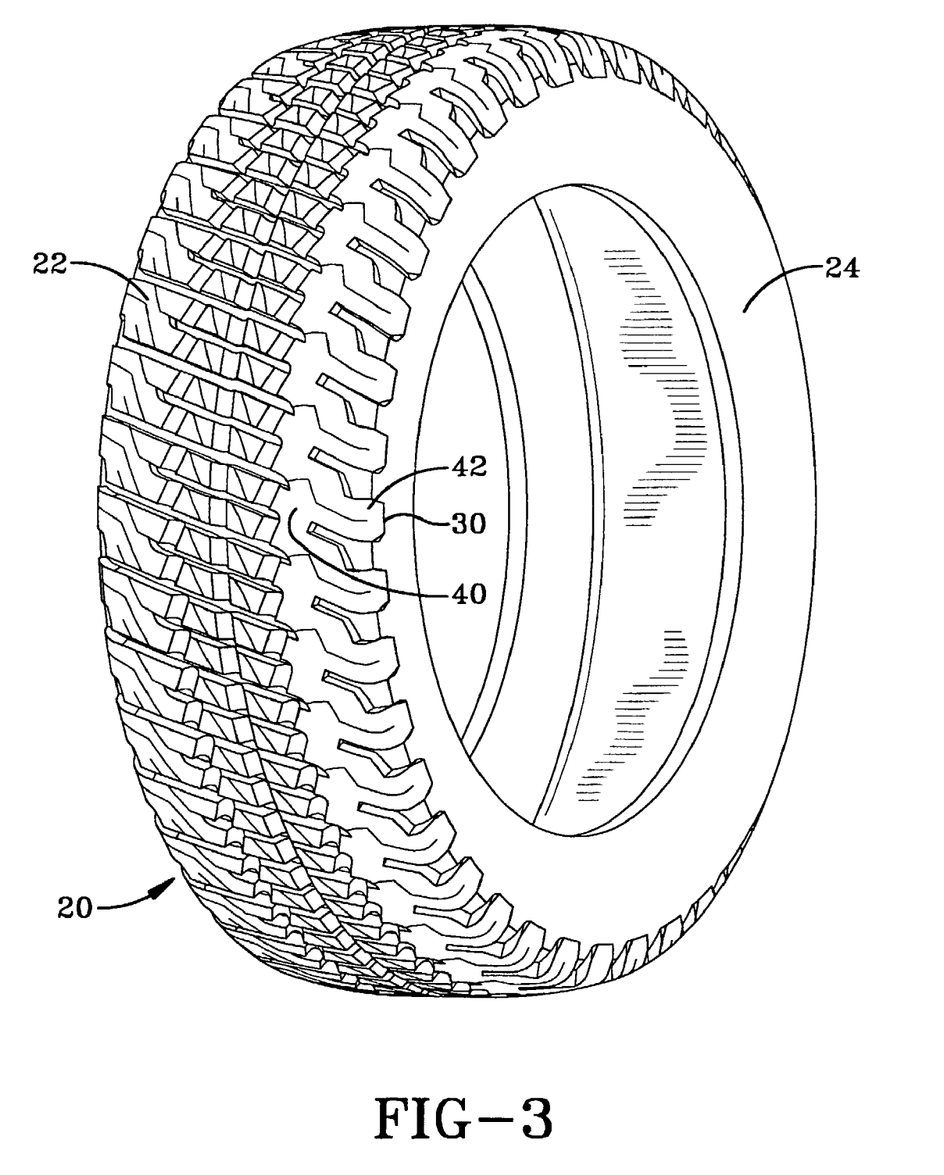
FIG. 3 is a tire perspective view made according to the invention.
Figure 4:
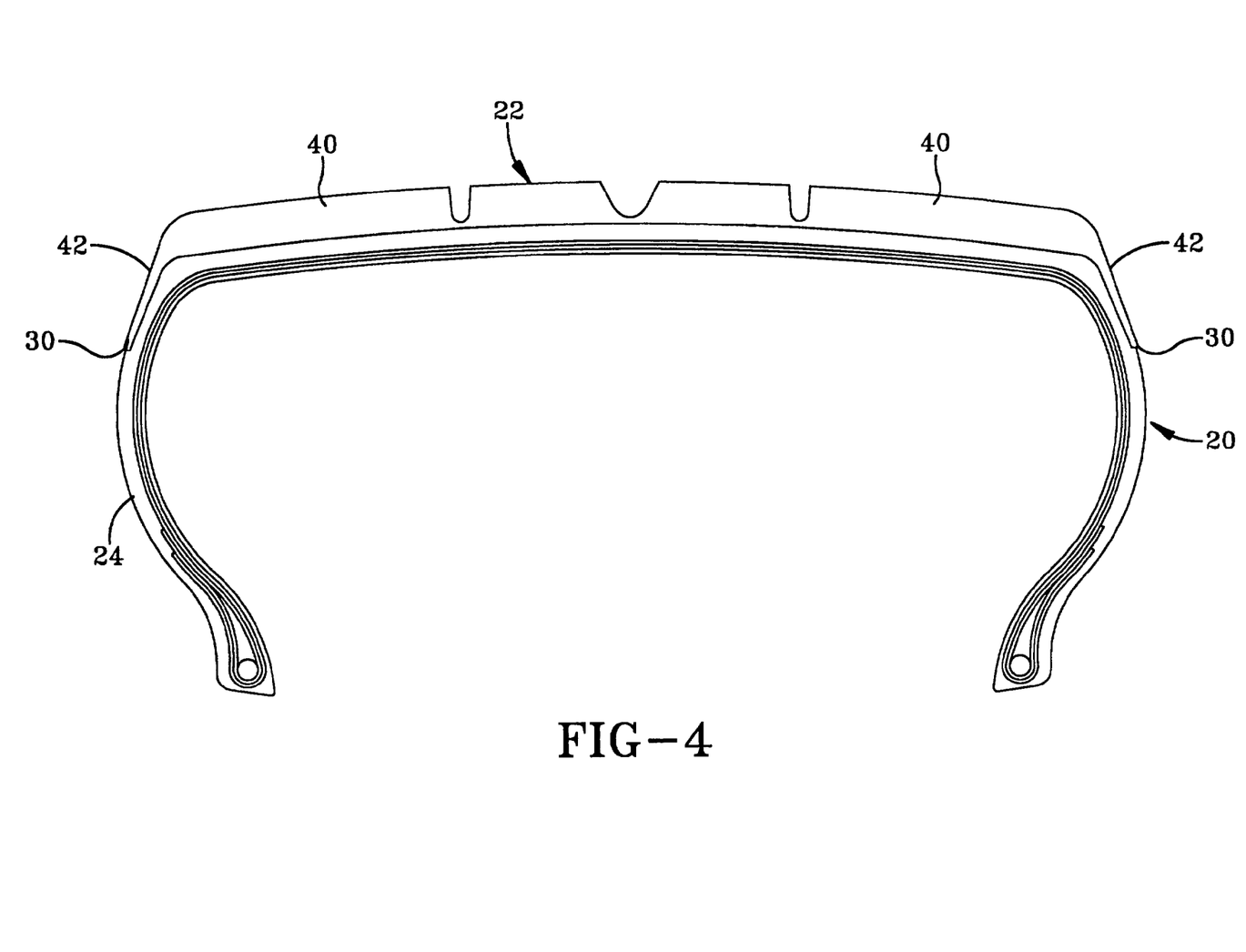
FIG. 4 is a cross-sectional view of the tire made according to the invention.
Figure 5:
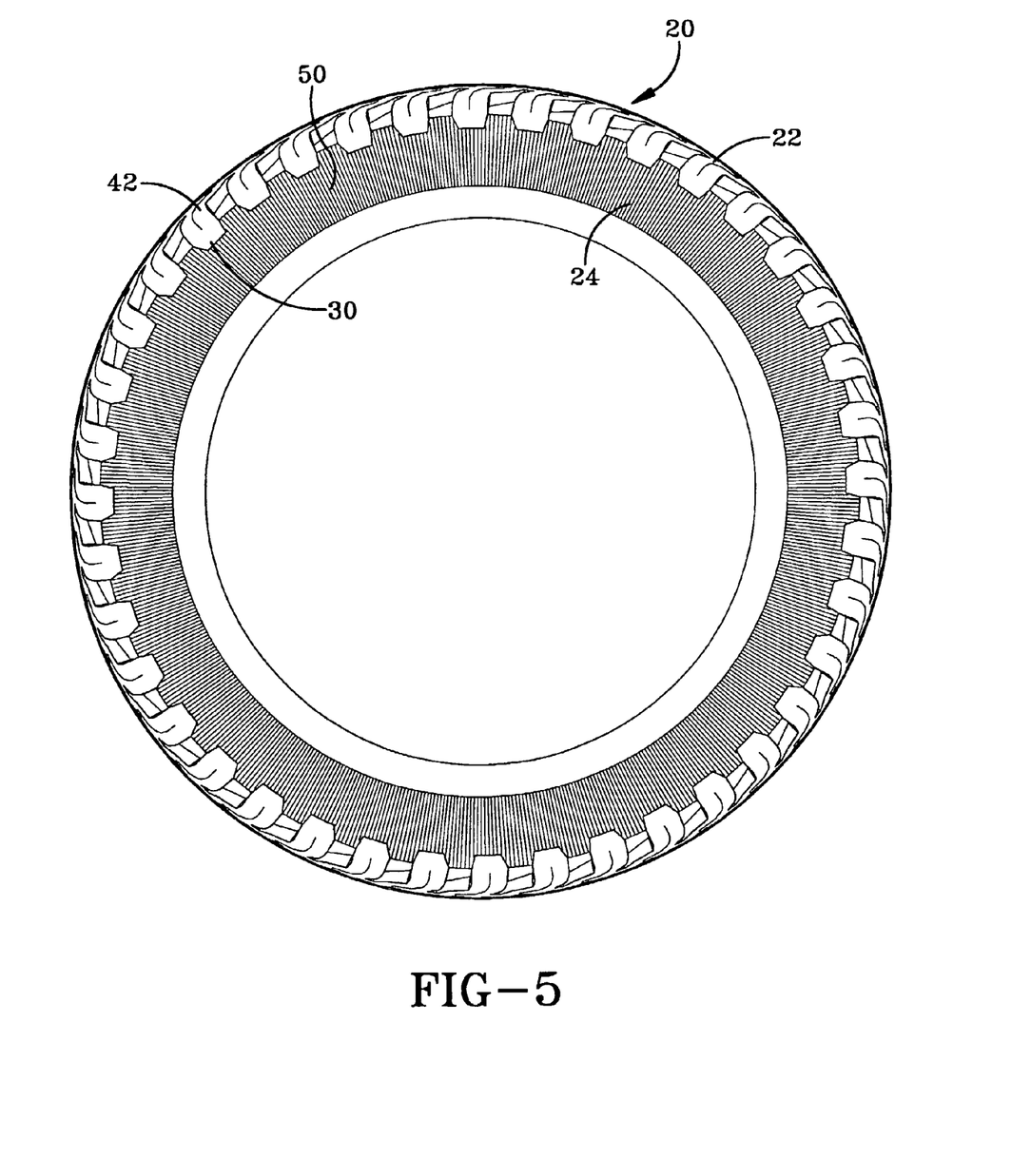
FIG. 5 is a plan side view of a tire made according to the invention.

The sequence of steps described above are generally appreciated by those of ordinary skill in the tire molding art. The segments (4) of the mold (2) and the upper and lower sidewall forming rings (6,8) are fabricated in such a way that in the process of molding the tire (20), the tread (22) is formed with a sidewall (24) having complimentary lug extensions (30) circumferentially aligned with the axially outer portion (42) of the traction lugs (40) as illustrated in FIGS. 3, 4, and 5 of the drawings of the tire (20). The tread forming segments (4) alone forms the radially outer surface of the tire (20) and have a plurality of shoulder tread element forming cavities (11) that form the entire radially outer surface of a shoulder tread element of the tire (20).

Figure 6:
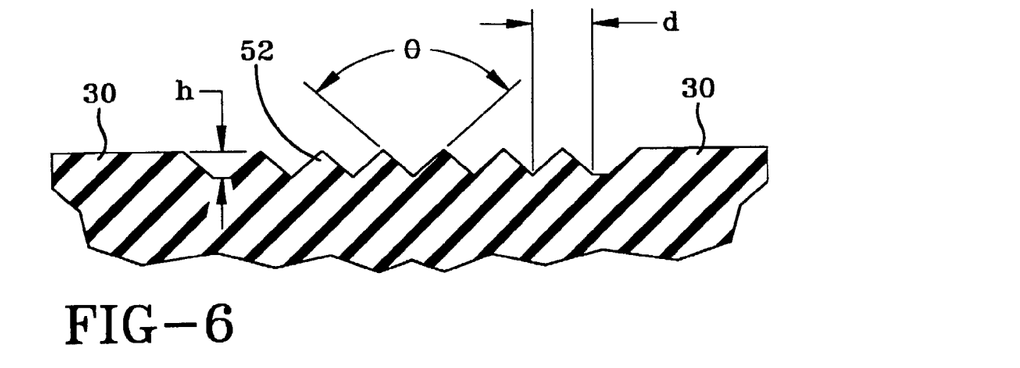
FIG. 6 is a cross-sectional view of the annular rings (6,8) taken along lines (6—6) of FIG. 2 depicting the band (50) forming ridges and grooves.
Figure 7:
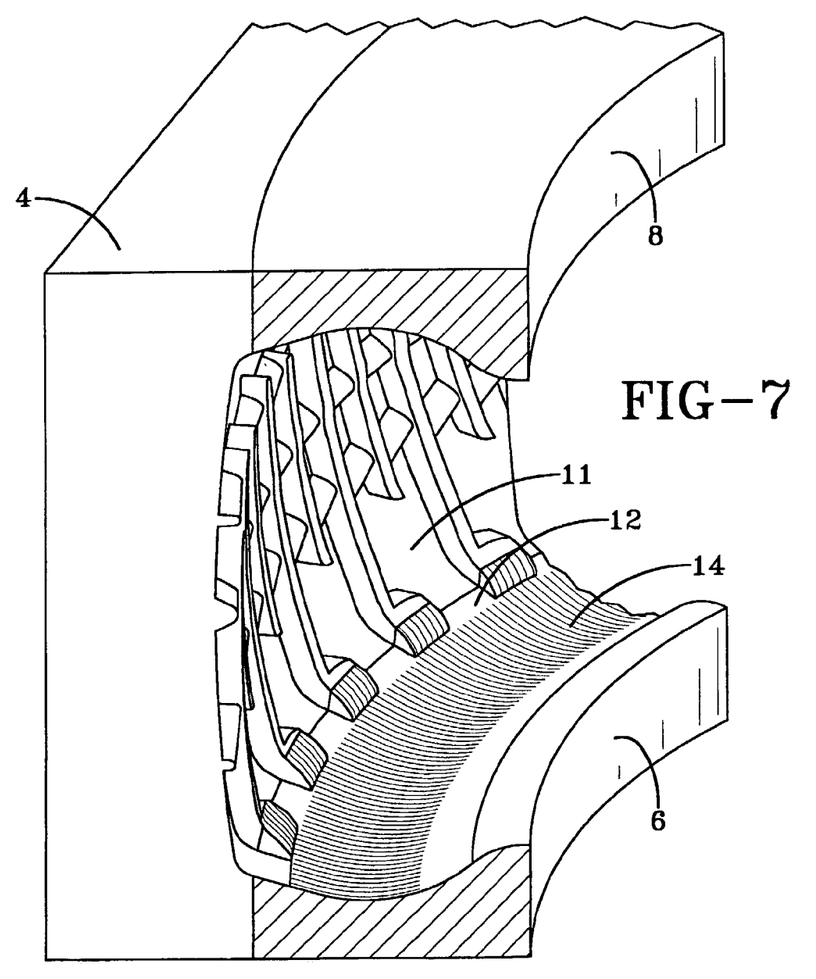
FIG. 7 is a partial enlarged plan view of a mold segment abutted against an annular ring (6,8) showing the relationship of the lug extension (12) and the axially outer portion (42) of the lug (40) forming cavity of the preferred embodiment tire exhibiting the band (50) forming ridges and grooves.

As shown in FIGS. 5, 6, and 7 in the preferred embodiment tire (20) of the invention these sidewall lug extensions (30) extend radially inward a substantial distance into the sidewall indicia band (50) as shown. The ridges forming the radially outer portion (52) of the indicia band (50) is preferably at the radially outermost extreme of the annular rings (6,8) of the mold (2).

Figure 8A:
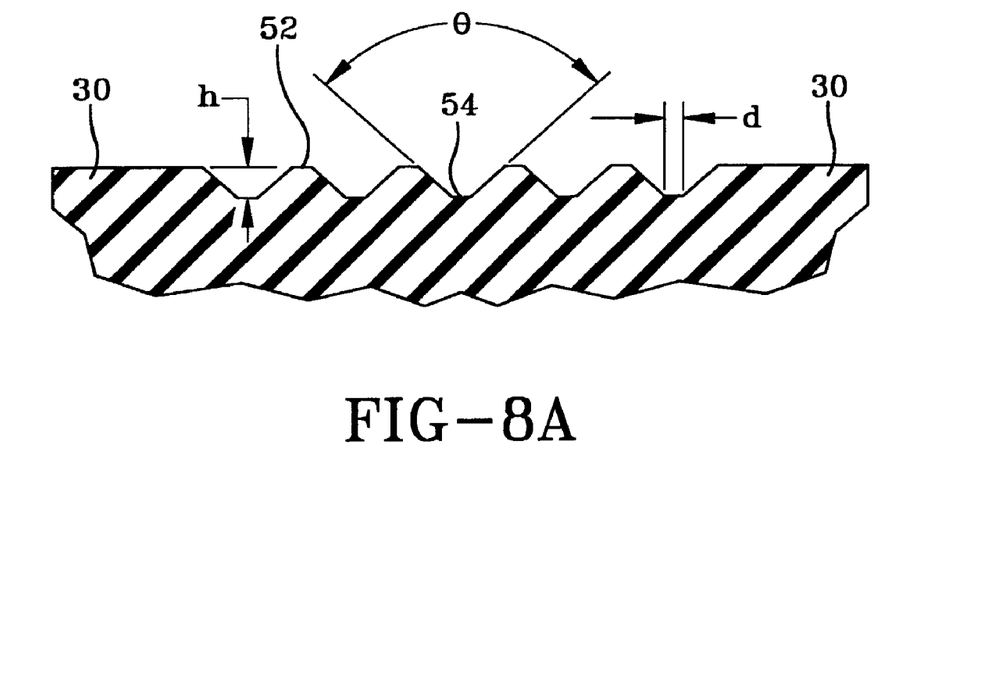
FIG. 8A is the cross-sectional view of the tire (20) as molded shown from FIG. 5 wherein the lug extension is flush or not projecting from the sidewall (24).
Figure 8B:
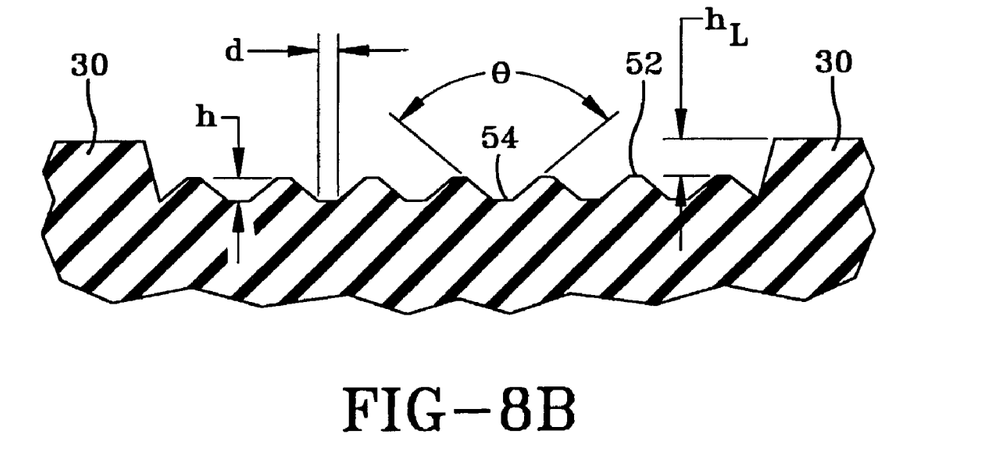
FIG. 8B is the alternative view of the FIG. 8A wherein the lug extension extends outwardly from the ridges of band (50).

In some cases the lug extensions (30) project outwardly from the sidewall of the tire such that the extensions have a pronounced radial height ($h_r$) as measured from the adjacent surfaces of the sidewall as shown in FIG. 8B. In these cases the tire designer may (as in FIG. 5) or may not (as in FIG. 3) employ an annular band of ridges (50) outlining the lug extensions (30). In such a case the annular ring (6,8) has the lug extension-forming portion made of cavities (12) or depressions cut into the mold rings (6,8). Each of these cavities (12) must align precisely with the angular orientation of the axially outer portions (42) of the lug (40) forming cavities (11) in the mold segments (4).

While this may appear simple it must be understood that tire tread patterns are generally pitched. When the tire (20) is pitched, the lug forming cavities (11) of the tread will utilize two or more pitch lengths, and the sidewall forming rings (6,8) have corresponding and aligned pitches for the lug extension surfaces (30) resulting in a tire (20) having the pitched tread lugs (40) and the corresponding pitched lug extensions (30) circumferentially aligned. That is the adjacent tread elements vary in size around the tread to minimize noise generation. Accordingly, this size variation is clearly seen and therefore added a unique alignment complexity to the use of this lug extension. A noticeable step-off in the alignment can occur if the segments and the mold ring are not truly precisely aligned. A second very subtle way in which a misalignment occurs is the thermal expansion of the components must be compensated for. That is when the molds are heated the rings (6,8) and the segment (4) must be assumed to operate at a steady state curing temperature. If this is not true the expansion difference can effect the alignment. Fortunately, while the segment (4) and the annular rings (6,8) are not always operated at identical temperatures due to heating and cooling differences in the mold itself. Each mold achieves a steady state temperature at each location of the segment (4) and the rings (6,8) such that the cavities (11,12) can be aligned by a mold maker adjusting the ring cavities (12) to match corresponding the segment cavity (11) at the edges so that a precise alignment is achieved. In this way the lug extensions (30) are so accurately aligned it is almost impossible to discern where the ring (6,8) starts and segments (4) stop.

While this may seem trivial to a tire manufacturer tire appearance is important and in the area of the sidewall where the manufactures name appears this region demands the highest of quality.

A preferred embodiment method of forming the appearance of lug extensions (30) along the sidewall is to provide the sidewall band (50) comprised of a plurality of radially extending grooves (54) and ridges (52) in the sidewalls (24). This band (50) is made by cutting ridges (14) of substantially triangular cross-section into the annular ring (6,8) having an included angle θ of about 90° having a height (h) and preferably spaced a distance (d) respectively, extending to the location of the abutting relationship with the segment (4) or through the radial extremes of the annular rings (6,8) as shown in FIG. 7.

In one method as shown in FIG. 8A at the locations where the lug extensions (30) are to be formed the ridges (14) are simply ground away leaving a smooth surface (5) on the rings (6,8). What is so clever about this approach is that the band grooves (54) are depressions in the sidewall (24) and the lug extension (30) actually can be made flush to the exterior surface of the sidewall (24) without actually projecting outwardly. Nevertheless to the observer it appears as though the lugs are projecting outwardly when they are not. This technique has several benefits in that the propensity for crack propagation to occur is eliminated in that the stress risers common in this area of the tread shoulder are eliminate. Furthermore, the scuff resistance of the lug extensions (30) is better in that the lug extensions (30) really are not extending outwardly.

If on the other hand the tire designer chooses he may use this band (50) with a projecting lug extension (30) as shown in FIG. 8B, by simply having the annular rings (6,8) having the smooth portion defining the lug extension (30) deeper into the mold forming the cavities (11) as described before wherein the depth of the cavity is greater than the space between the ridges (52) of the band (50). In this case, the lug extensions (30) project well above the sidewall (24) surface area by an amount of 1 mm or more.

Figure 9:
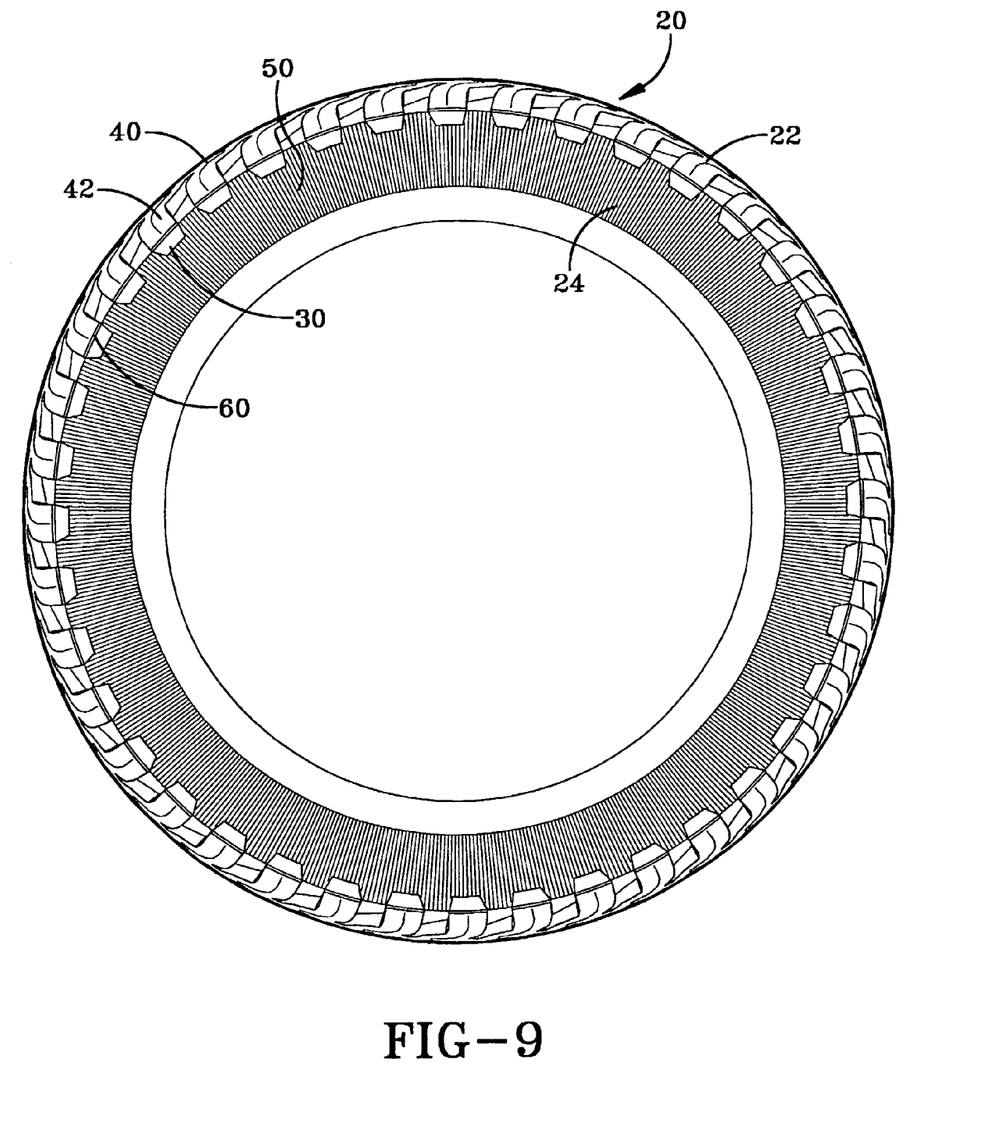
FIG. 9 is an alternative tire (20) made according to the invention.

In one alternative tire (20) at the location wherein the lug extension surface (30) abuts the axially outer portion of the lug (40) a small groove (60) may be used; this groove (60) effectively mask any flash or joint lines that may occur as well as hide any misalignment of the abutting features.

Interestingly with computer-controlled modeling and mold manufacture, this feature is generally not required because the fit between the segments (4) and the rings (6,8) can be made without any misalignment or fit problems.

As can be seen from the above description the present invention achieves a novel method to create a distinctive aggressive looking tread pattern that is inexpensive to produce but also of superb styling and appearance.

What is claimed is:

1. The method of molding a tire (20) in a segmented mold (2) having tread forming segments (4) and a pair of annular sidewall forming rings (6,8); the method comprising the following steps:
    placing an unvulcanized tire (20) into the segmented mold (2);
    closing the mold (2) by a) radially contracting the tread forming segments (4) each tread forming segment (4) having a plurality of a shoulder tread element forming cavities (11) that form the entire radially outer surface of shoulder tread elements of the tire (20), the cavities (11) having circumferentially spaced axially outer ends (9), b) bringing into abutting relation the tread forming segments (4) and the annular sidewall forming rings (6,8), having a plurality of tread element extension forming surfaces (12) and a plurality of radially extending ridges (14) that extend to the location of the abutting relationship with the tread forming segments (4) and c) circumferentially aligning the plurality of tread element extension forming surfaces (12) of the annular sidewall forming rings (6,8) with the angular orientation of the axially outer ends (9) of the tread element forming cavities (11) of the tread forming segments (4);
    applying heat and pressure curing the tire; opening the mold (2); and
    removing the cured tire (20).

2. The method of molding a tire (20) in a segmented mold (2) having tread forming segments (4) of claim 1 further includes the step of fabricating the segmented mold (2), and aligning the tread element extension forming surfaces (12) of the annular rings (6,8) with the axially outer ends (9) of the tread forming cavities (11) of the segments (4) when the mold (2) is in the closed position.

3. The method of molding a tire (20) in a segmented mold (2) having tread forming segments (4) of claim 2 wherein the step of fabricating the mold (2) includes the step of pitching the tread formed by the segments (4) in two or more distinct pitch sizes and arranging the two or more pitch sizes in a pitch sequence, and
    pitching the tread element extension forming surfaces (12) formed by the annular rings (6,8) to correspond to the pitch sizes and the pitch sequence of the tread forming segments (4).

4. The method of molding a tire as set forth in claim 1 wherein the ridges have a substantially triangular cross section having an included angle of about 90°.

5. The method of molding a tire as set forth in claim 1 wherein at the location where tread element forming cavities (11) of the tread forming segments (4) and the tread element extension forming surfaces (12) of the annular sidewall forming rings (6,8) abut, means are provided to form circumferentially extending groove in the tire.

6. A mold (2) for making a tire having a plurality of tread lugs (40), the mold (2) having four or more radially movable tread forming segments (4), the segments (4) when closed forming an annular tread ring, and an upper sidewall forming ring (8) and a lower sidewall forming ring (6), the segments (4) having a plurality of lug forming cavities (11), each lug forming cavity extending to a radially inner end (9) location, the mold being characterized by:
    each sidewall forming ring (6,8) having a plurality of shoulder lug extension surfaces (12) circumferentially aligned with the lug forming cavities (11) of the mold segments (4) and having a plurality of radially extending ridges that extend to a location of the abutting relationship with the tread forming segments, and
    wherein the segments alone form the radially outer surface of the tire.

7. The mold of claim 6 wherein the lug forming cavities (11) are pitched utilizing two or more pitch lengths, and the sidewall forming rings (6,8) have corresponding and aligned pitches for the lug extension surfaces (30).

8. The mold of claim 5 wherein the ridges have a substantially triangular cross section having an included angle of about 90°.

9. The mold of claim 6 wherein the mold has means to form a small circumferentially extending groove at the location wherein the plurality of shoulder lug extension surfaces (12) of the sidewall forming rings (6,8) and the lug forming cavities (11) of the mold segments (4) are circumferentially aligned.

* * * * *